(12) United States Patent
Kamiyama et al.

(10) Patent No.: US 7,056,064 B2
(45) Date of Patent: Jun. 6, 2006

(54) BLOCK UNIT FOR REPAIRING FLOW PASSAGE FACILITIES AND METHOD OF REPAIRING FLOW PASSAGE FACILITIES

(75) Inventors: Takao Kamiyama, Hiratsuka (JP); Yasuhiro Yokoshima, Ibaraki-ken (JP)

(73) Assignees: Shonan Gosei-Joshi Seisakusho K.K., Kanagawa-Ken (JP); Yokoshima & Company, Ibaraki-Ken (JP)

( * ) Notice: Subject to any disclaimer, the term of this patent is extended or adjusted under 35 U.S.C. 154(b) by 0 days.

(21) Appl. No.: 10/255,935

(22) Filed: Sep. 26, 2002

(65) Prior Publication Data

US 2003/0136455 A1    Jul. 24, 2003

(30) Foreign Application Priority Data

Jan. 23, 2002  (JP)  ............................. 2002-014213
Jul. 24, 2002  (JP)  ............................. 2002-214976

(51) Int. Cl.
*E21D 9/00*  (2006.01)
*E21D 11/00*  (2006.01)

(52) U.S. Cl. ................... 405/146; 405/150.1; 405/153; 138/176

(58) Field of Classification Search ................ 405/146, 405/147, 150.1, 153, 184.1, 184.2, 184.5; 138/97–99, 172, 175, 176, 155; 264/26.17, 264/36.17; 285/123.15; 52/DIG. 3
See application file for complete search history.

(56) References Cited

U.S. PATENT DOCUMENTS

| | | | | |
|---|---|---|---|---|
| 984,337 | A | * | 2/1911 | Woodworth ................. 405/153 |
| 1,923,006 | A | | 8/1933 | Proctor |
| 2,308,677 | A | * | 1/1943 | Dailey ..................... 52/DIG. 7 |
| 3,282,301 | A | * | 11/1966 | Ligon ......................... 138/175 |
| 3,742,985 | A | * | 7/1973 | Rubenstein ................. 138/141 |
| 3,859,802 | A | * | 1/1975 | Platner et al. .............. 405/152 |
| 4,371,197 | A | * | 2/1983 | Chabrier ...................... 285/47 |
| 4,484,724 | A | * | 11/1984 | Srackangast ................. 249/11 |
| 4,557,627 | A | * | 12/1985 | Schmid et al. ............. 405/146 |

(Continued)

FOREIGN PATENT DOCUMENTS

EP    0 060 134    11/1986

(Continued)

OTHER PUBLICATIONS

European Search Report for Application No. EP 03 01 6927 in 1 page.

*Primary Examiner*—Jong-Suk (James) Lee
(74) *Attorney, Agent, or Firm*—Knobbe, Martens, Olson & Bear, LLP

(57) ABSTRACT

A block unit for repairing flow passage facilities is provided for permitting a desired repair operation. A method of repairing flow passage facilities using the block unit is also provided. The block unit includes an inner plate defining an inner surface, an outer plate disposed along a peripheral edge of the inner plate, and a plurality of reinforcing ribs for reinforcing the inner plate and the outer plate. The block units adjoining in a circumferential direction are joined together with bolts inserted through both circumferential end faces of each the block unit and nuts fitted on the bolts to form a short tube within a flow passage. The short tubes are connected in a longitudinal direction to form a continuous tubular assembly having an outer diameter smaller than an inner diameter of the flow passage. A grout material is injected into a clearance space formed between the tubular assembly and the flow passage.

25 Claims, 20 Drawing Sheets

U.S. PATENT DOCUMENTS

| | | | | |
|---|---|---|---|---|
| 4,621,948 A | * | 11/1986 | Hentschel | 405/146 |
| 4,685,983 A | | 8/1987 | Long, Jr. | |
| 4,724,108 A | | 2/1988 | Jurgenlohmann et al. | |
| 4,799,814 A | * | 1/1989 | Okubo et al. | 400/639.1 |
| 4,863,313 A | * | 9/1989 | Yamamoto et al. | 405/146 |
| 4,954,106 A | * | 9/1990 | Shuh-Chin | 440/21 |
| 5,032,197 A | * | 7/1991 | Trimble | 156/71 |
| 5,778,937 A | | 7/1998 | Sundermann | |
| 5,833,394 A | * | 11/1998 | McCavour | 405/126 |
| 5,928,447 A | | 7/1999 | GianFrancisco | |
| 5,967,192 A | | 10/1999 | Lewin | |

FOREIGN PATENT DOCUMENTS

| | | | | |
|---|---|---|---|---|
| GB | 2041147 | | 9/1980 | |
| GB | 2167796 | * | 6/1986 | 405/150.1 |
| JP | 03002498 | * | 1/1991 | 405/150.1 |
| JP | 05248184 | * | 9/1993 | 405/150.1 |
| JP | 2001317298 | * | 11/2001 | |

* cited by examiner

BLOCK UNIT FOR REPAIRING FLOW PASSAGE FACILITIES AND METHOD OF REPAIRING FLOW PASSAGE FACILITIES

PRIORITY INFORMATION

This application is based on and claims priority to Japanese Patent Applications No. 2002-014213, filed on Jan. 23, 2002, and No. 2002-214976, filed on Jul. 24, 2002, the entire contents of which are hereby expressly incorporated by reference herein.

BACKGROUND OF THE INVENTION

1. Field of the Invention

The present invention relates to a block unit for repairing flow passage facilities, and to a method of repairing flow passage facilities using the block unit.

2. Description of the Related Art

When an underground pipe, such as pipelines and passageways, becomes defective or too old to perform properly, the pipe is repaired and rehabilitated without digging the earth to expose the pipe and disassembling the sections of the pipe. This non-digging method of repairing an underground pipe has been known and practiced commonly in the field of civil engineering. The pipe lining method utilizes a tubular pipe liner bag that is made of a resin-absorbent material impregnated with a hardenable resin and has the outer surface covered with a highly air-tight plastic film. The tubular pipe liner bag is inserted into a pipe to be repaired by means of a pressurized fluid such that the pipe liner bag is turned inside out as it proceeds deeper in the pipe. Hereinafter, this manner of insertion shall be called "everting." When the entire length of the tubular liner bag is everted (i.e., turned inside out) into the pipe, the everted tubular liner is pressed against the inner wall of the pipe by a pressurized fluid, and the tubular flexible liner is hardened as the hardenable resin impregnated in the liner is heated, which is effected by heating the fluid filled in the tubular liner bag. It is thus possible to form a plastic pipe within the pipe to repair the same.

In the pipe lining method as described above, a service fluid such as sewage must be temporarily stopped or be bypassed around a portion of the pipe subjected to the repair in order to prevent the service fluid from flowing therethrough.

However, since a large amount of service fluid must be bypassed, particularly, in the event of repairing a pipe having a large diameter, the repair operation encounters difficulties in installing large scale facilities for bypassing the service fluid.

To solve this problem, there has been proposed a method of repairing a pipe while a service fluid is passed therethrough. Specifically, this method involves introducing a small cylindrical tube having an outer diameter smaller than the inner diameter of the pipe from a manhole into the entrance of the pipe, pushing the short tube with a hydraulic jack or the like for insertion into the pipe, and repeating this operation to repair the pipe.

However, when the foregoing method is applied to a pipe having a large inner diameter (for example, 600 millimeters or more), the short tube used in this method also has a large diameter. This short tube has too large of a diameter to fit through a manhole.

SUMMARY OF THE INVENTION

The present invention has been made in view of the problem mentioned above, and it is an object of the present invention to provide a block unit for repairing flow passage facilities which permits a desired repair operation even for a flow passage having a large diameter while a service fluid is passed therethrough.

It is another object of the present invention to provide a method of repairing flow passage facilities using the block unit.

To achieve the above objects, in accordance with one aspect of the invention, there is provided a block unit for repairing flow passage facilities. A plurality of the block units are assembled into a tubular assembly which is used to repair a pipe. The block unit includes an inner plate defining an inner surface, an outer plate disposed along a peripheral edge of the inner plate, and a plurality of reinforcing ribs for reinforcing the inner plate and the outer plate.

Preferably, the inner plate, the outer plate, and the reinforcing ribs are formed with a plastic material.

Also, preferably, in the block unit, the outer plate and the reinforcing ribs define bolt throughholes. The block unit may have a circumferential dimension larger than a width dimension. The plastic material may be transparent or translucent.

To achieve the above object, in accordance with another aspect of the invention there is provided a method of repairing flow passage facilities using block units for repairing flow passage facilities which are assembled into a tubular assembly. The block unit includes at least an inner plate defining an inner surface, and an outer plate disposed along a peripheral edge of the inner plate. The method includes joining the block units adjoining in a circumferential direction preferably with bolts inserted through both circumferential end faces of each the block unit and nuts fitted on the bolts associated therewith to form a short tube within a flow passage, forming a plurality of short tubes in this manner, connecting the short tubes in a longitudinal direction to form a continuous tubular assembly having an outer diameter smaller than an inner diameter of the flow passage, and injecting a grout material into a clearance space formed between the tubular assembly and the flow passage.

According to the present invention, a plurality of block units are joined to each other in the circumferential direction to form the short tubes within a flow passage, and the short tubes are connected to each other in the longitudinal direction to form the continuous tubular assembly having an outer diameter smaller than the inner diameter of the flow passage within the flow passage, so that the pipe, even having a large diameter, can be repaired by introducing the block units into the pipe through a manhole or the like, assembling the block units into the continuous tubular assembly within the flow passage. Moreover, since this operation can be performed while a service fluid is flowing through the flow passage, a desired repair can be made for the flow passage, even having a large diameter, while the service fluid is flowing therethrough.

The above and other objects, advantages and features of the present invention will become more apparent from the following detailed description of embodiments when read in conjunction with the accompanying drawings.

DESCRIPTION OF THE PREFERRED EMBODIMENTS

The present invention will hereinafter be described in connection with several preferred embodiments thereof with reference to the accompanying drawings.

Figure 1:
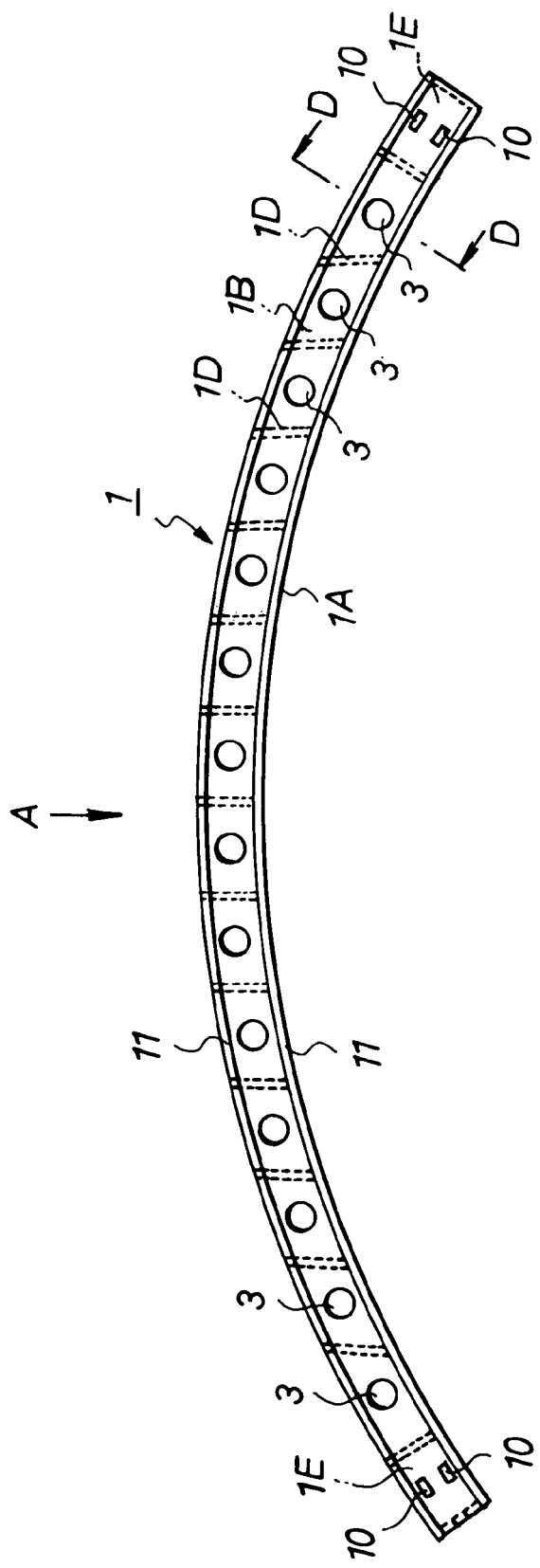
FIG. 1 is a side view of a block unit for repairing a pipe according to one embodiment of the present invention.
Figure 2:
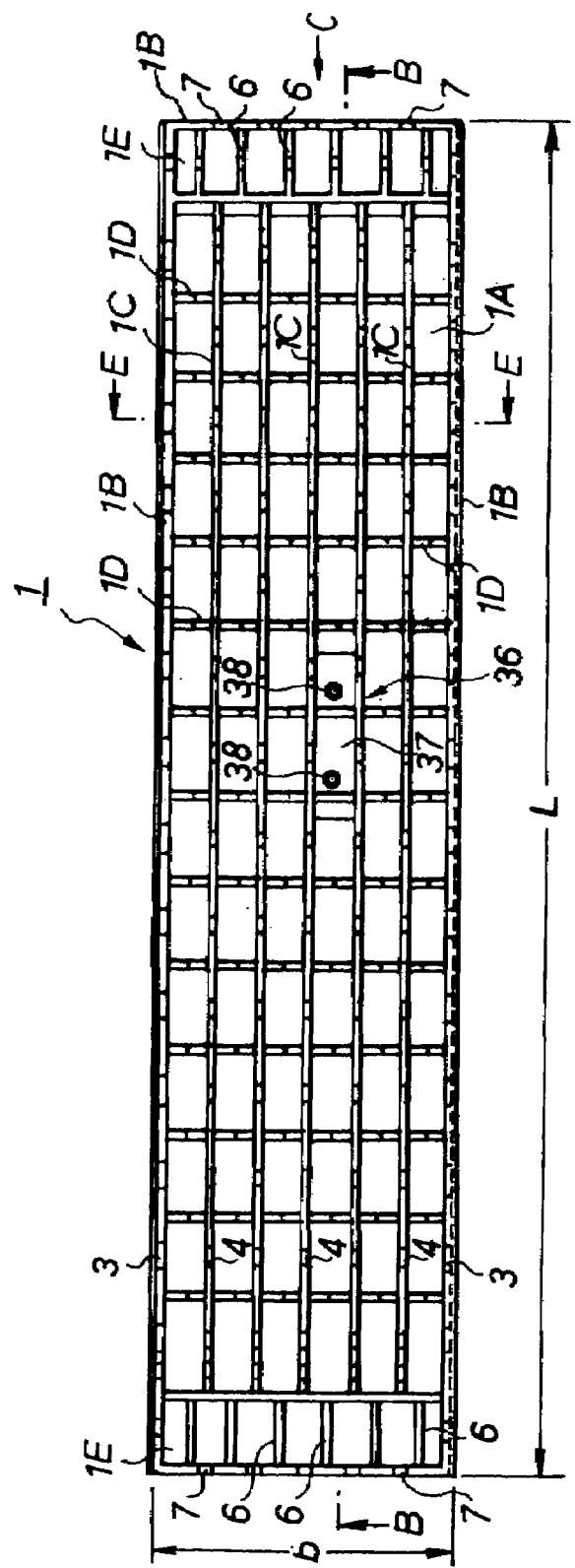
FIG. 2 is an outer view (seen in a direction indicated by an arrow A in FIG. 1) of the block unit for repairing a pipe according to the embodiment.
Figure 3:
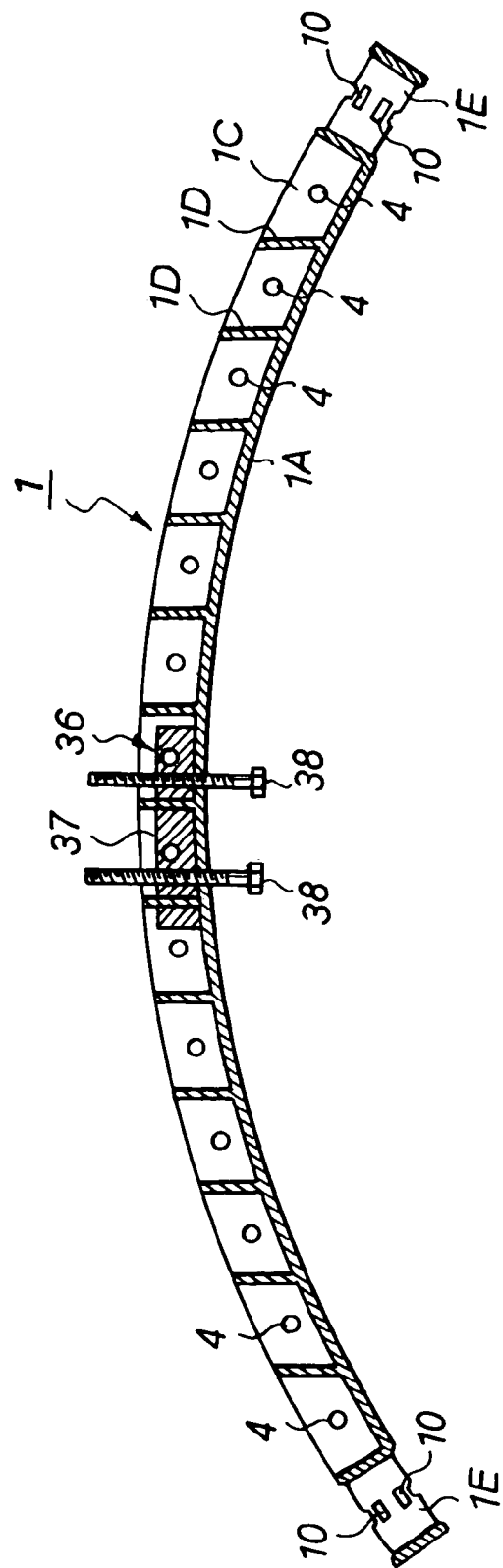
FIG. 3 is a cross-sectional view taken along a line B—B in FIG. 2.
Figure 4:
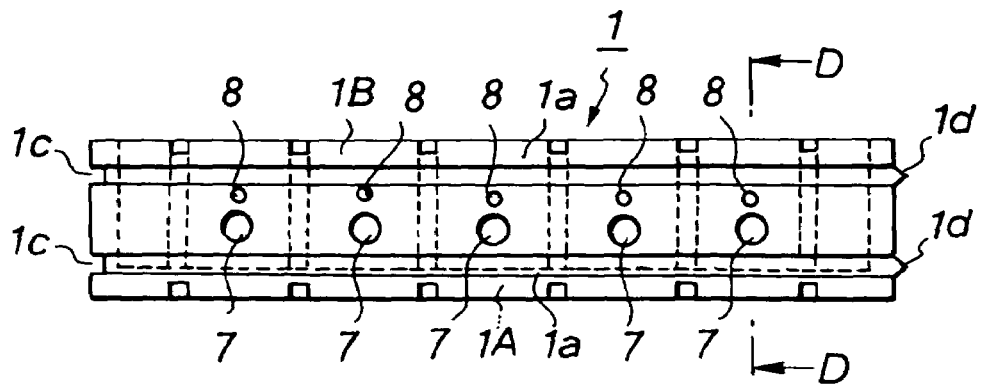
FIG. 4 is a diagram illustrating the block unit when seen in a direction indicated by an arrow C in FIG. 2.
Figure 5:
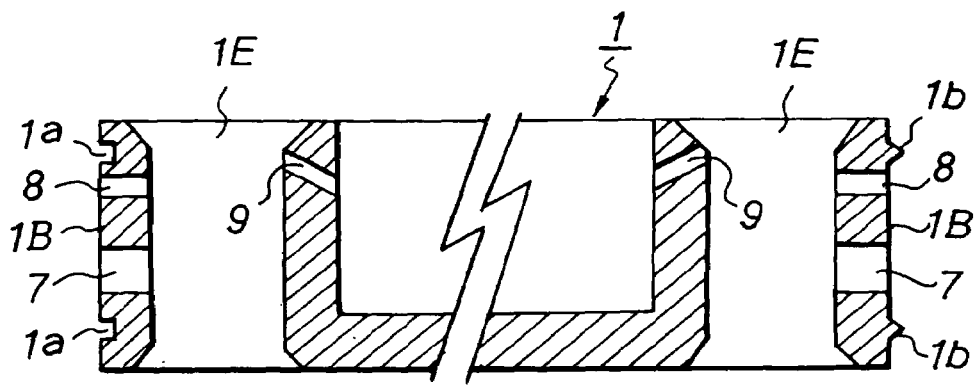
FIG. 5 is a cross-sectional view taken along a line D—D in FIG. 4.
Figure 6:
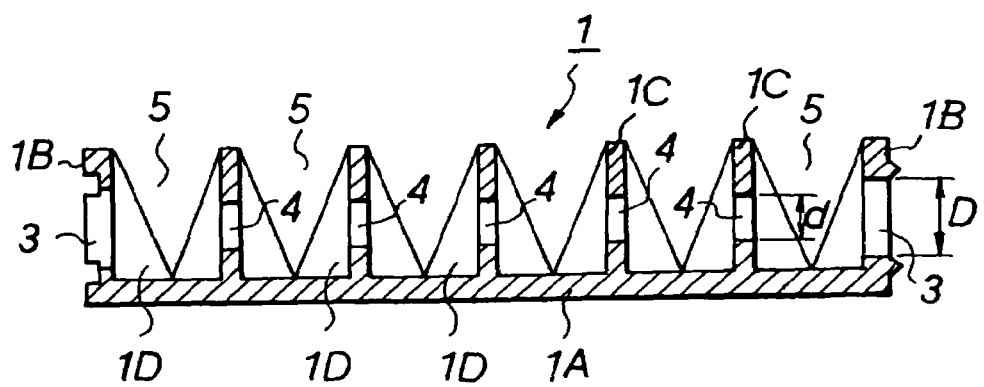
FIG. 6 is a cross-sectional view taken along a line E—E in FIG. 2.
Figure 7:
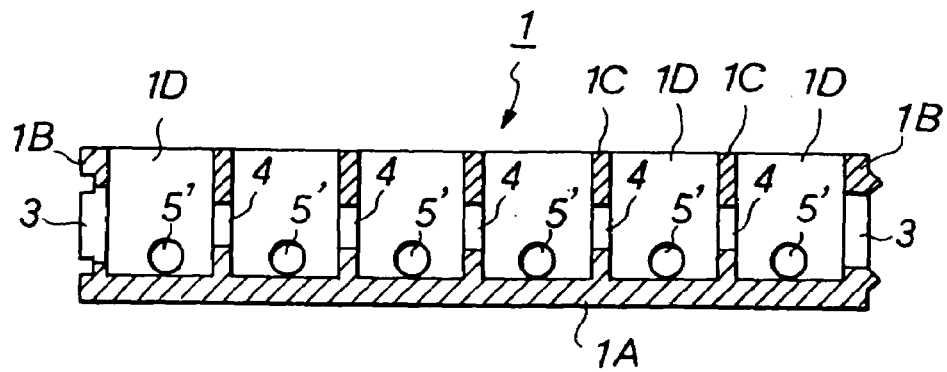
FIG. 7 is a cross-sectional view, similar to FIG. 6, illustrating an exemplary modification to the embodiment of FIG. 1.
Figure 8:
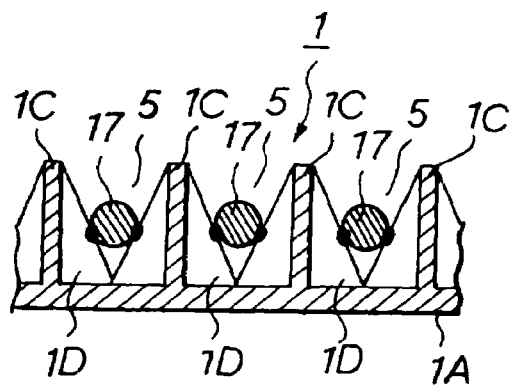
FIGS. 8 and 9 are partial cross-sectional views illustrating a structure for attaching a reinforcement material (reinforcing steel)
Figure 9:
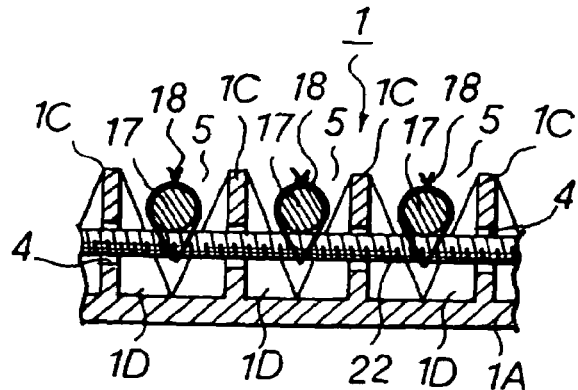
Figure 10:
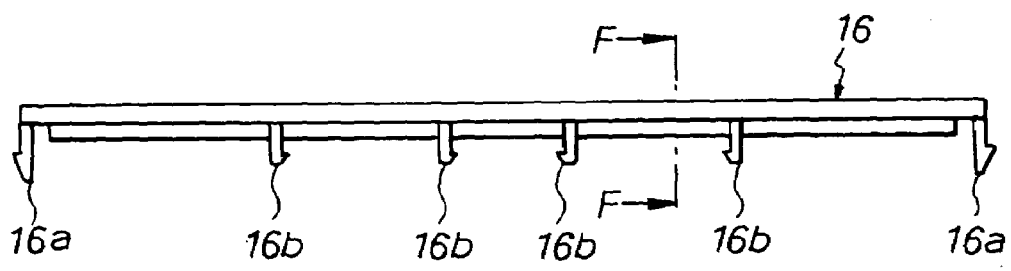
FIG. 10 is a side view of a cover.
Figure 11:
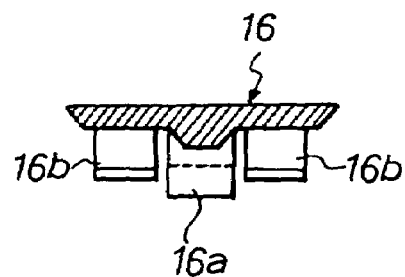
FIG. 11 is a cross-sectional view taken along a line F—F in FIG. 10.

FIG. 1 is a side view of a block unit for repairing a pipe according to one embodiment of the present invention; FIG. 2 is an outer view (seen in a direction indicated by an arrow A in FIG. 1) of the block unit for repairing a pipe according to the embodiment; FIG. 3 is a cross-sectional view taken along a line B—B in FIG. 2; FIG. 4 is a diagram illustrating the block unit when seen in a direction indicated by an arrow C in FIG. 2; FIG. 5 is a cross-sectional view taken along a line D—D in FIG. 4; FIG. 6 is a cross-sectional view taken along a line E—E in FIG. 2; FIG. 7 is a cross-sectional view, similar to FIG. 6, illustrating an exemplary modification to the embodiment of FIG. 1; FIGS. 8 and 9 are partial cross-sectional views illustrating a structure for attaching a reinforcement material (reinforcing steel); FIG. 10 is a side view of a cover; and FIG. 11 is a cross-sectional view taken along a line F—F in FIG. 10.

The block unit 1 for repairing flow pass facilities (hereinafter simply called the "block unit 1") according to one embodiment of the present invention forms part of a short tube 2 having an outer diameter smaller than the inner diameter of a pipe 20 illustrated in FIGS. 12 and 13 (the short tube 2 is divided into a plurality (five in this embodiment) of pieces). The block unit 1 comprises an arcuate inner plate 1A defining an inner surface; an outer plate 1B disposed outward along the peripheral edge of the inner plate 1A; a plurality of reinforcing ribs 1C for reinforcing the inner plate 1A and outer plate 1B; a plurality of convex plates 1D for preventing the reinforcing ribs 1C from deforming; and boxes 1E disposed at both circumferential ends of the block unit 1.

These components 1A, 1B, 1C, 1D preferably are integrally formed by a transparent plastic material. The transparent plastic material forming part of the block unit 1 may be made of vinyl chloride, ABS, Duraster Polymer (Tradename), or the like. The block unit 1 is integrally molded by an injection method using such a plastic material to have the weight in a range of 1 kg to 10 kg. The inner plate 1A and outer plate 1B each have a thickness of 1.0 mm to 10.0 mm. A circumferential dimension L is set larger than a width dimension b (longitudinal direction of the pipe 20) (L>b), as can be seen FIG. 2. For purposes of injection molding for the block unit 1, a flat portion is partially formed around a plastic injection port on the inner surface of the inner plate 1A. Instead of the transparent plastic material, the block unit 1 may be made of a translucent plastic material or an opaque plastic material. PVC, polyethylene, and the like may be used for the block unit 1A made of a translucent plastic material, while polyester, ABS, polyethylene, polypropylene, and the like may be used for the block unit 1A made of an opaque plastic material.

In the block unit 1, a plurality (five in this embodiment) of the reinforcing ribs 1C extending in the circumferential direction (from left to right in FIG. 2) on the inner plate 1A are arranged in parallel at proper intervals in the width direction (vertical direction in FIG. 2, and longitudinal direction of the pipe 20). A plurality (thirteen in this embodiment) of the convex plats 1D, which extend on the inner plate 1A in a direction perpendicular to the respective reinforcing ribs 1C (width direction), are arranged in parallel at proper intervals in the circumferential direction. Thus, the inner plate 1A and outer plate 1B of the block unit 1 are reinforced by the plurality of reinforcing ribs 1C and the plurality of convex plates 1D arranged in a lattice form to increase the rigidity.

As illustrated in FIG. 2, in an area defined by the outer plate 1B and the convex plates 1D of the reinforcing ribs 1C, bolt throughholes 3 having a larger diameter and bolt throughholes 4 having a smaller diameters are formed along a straight line in the width direction (vertical direction in FIG. 2). Here, as illustrated in FIG. 6, the inner diameter D of the bolt throughholes 3 formed through the outer plate 1B is set larger than the inner diameter d of the bolt throughholes 4 formed through the reinforcing ribs 1C (D>d).

Also, as illustrated in FIG. 6, each area surrounded by the reinforcing rib 1C of each convex plate 1D is formed with a space 5 cut in V-shape which has a leading end in contact with the inner plate 1A. Alternatively, as illustrated in FIG. 7, a circular space 6' in contact with the inner plate 1A may be formed in each area surrounded by the reinforcing rib 1C of each convex plate 1D.

In this embodiment, a plurality of reinforcing steel rods 17 bent in an arcuate shape are arranged on the outer surface of the inner plate 1A along the circumferential direction as reinforcing materials for coupling a grout material to provide a high reinforcing effect, as illustrated in FIGS. 8 and 9. Specifically, each reinforcing steel rod 17 is inserted through the space 5 of each convex plate 1D of the block unit 1, and attached to each convex plate 1D with an adhesive, as illustrated in FIG. 8, or coupled to a bolt 22, later described, with a cord 18, as illustrated in FIG. 9. The bolt 22 is inserted into the bolt throughhole 4 formed through the reinforcing rib 1C.

Figure 22:
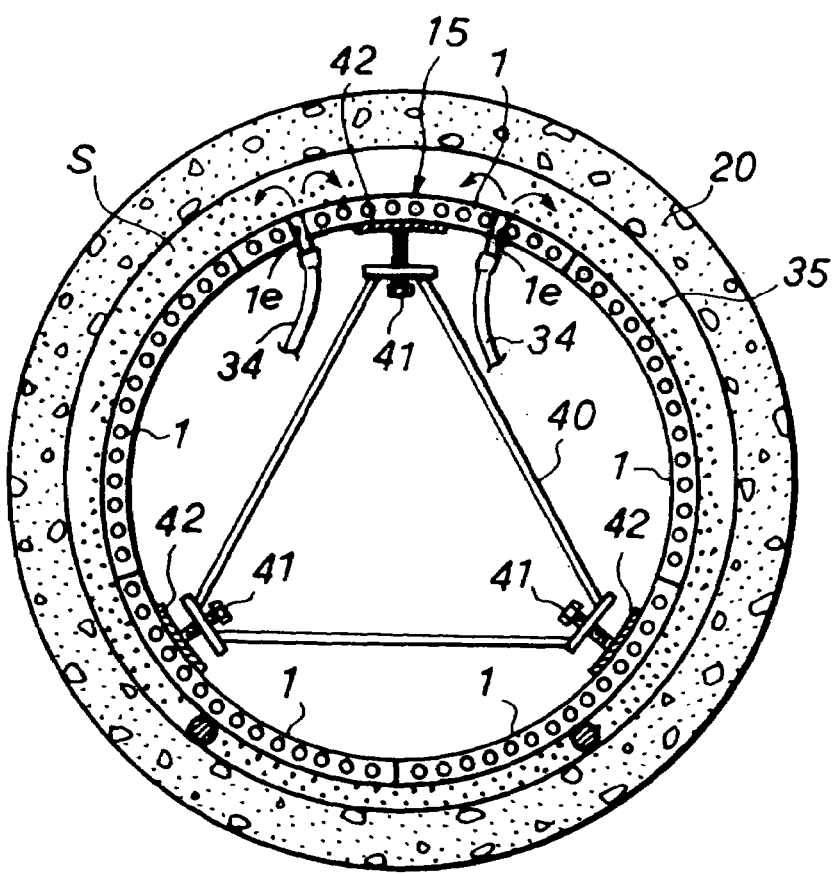
FIG. 22 is a transversal sectional view of a pipe formed with a tubular assembly therein.

Also, as illustrated in FIGS. 2 and 3, a spacer 36 is attached on the outer surface of the inner plate 1A of the block unit 1 for adjusting the spacing between the inner plate 1A and the inner wall of the pipe 20 (see FIG. 22). Here, the spacer 36 comprises a spacer base 37 attached to the outer surface of the inner plate 1A of the block unit 1 with the bolt 22 (see FIGS. 19 and 20), later described; and two bolts 38 removably screwed into the spacer base 37.

On the other hand, the inner surface and outer surface of the box 1E formed at each peripheral end of the block unit 1 are opened. The interior of the box 1E is partitioned by a plurality (six in this embodiment) of reinforcing ribs 6 arranged side by side in the width direction. Also, a plurality (five in this embodiment) of bolt throughholes 7 and air vents 8 are formed through the outer plate 1B which defines a peripheral outer end face, as illustrated in FIGS. 4 and 5. Further, as illustrated in FIG. 5, an air vent 8 is formed obliquely in the inner wall of the outer plate 1B. Two rectangular grooves 1a are formed in one peripheral end face of the outer plate 1B over the entire length thereof, while two protrusions 1b are formed on the other end face over the entire length thereof, as illustrated in FIG. 5.

As illustrated in FIG. 4, two rectangular grooves 1c are formed in one outer end face (outer end face in the longitudinal direction) of the outer plate 1B of the block unit 1, while two protrusions 1d are integrally formed on the other outer end face of the outer plate 1B.

Further as illustrated in FIG. 1, two inner and outer rectangular holes 10 are formed at both circumferential ends of both outer plates 1B of the block unit 1 (only one outer plate 1B is shown in FIG. 1).

In the illustrated embodiment, each block unit 1 generally has the same size and the same configuration as one another. However, the block units 1 can have various sizes and configurations that are different from one another.

Figure 14:
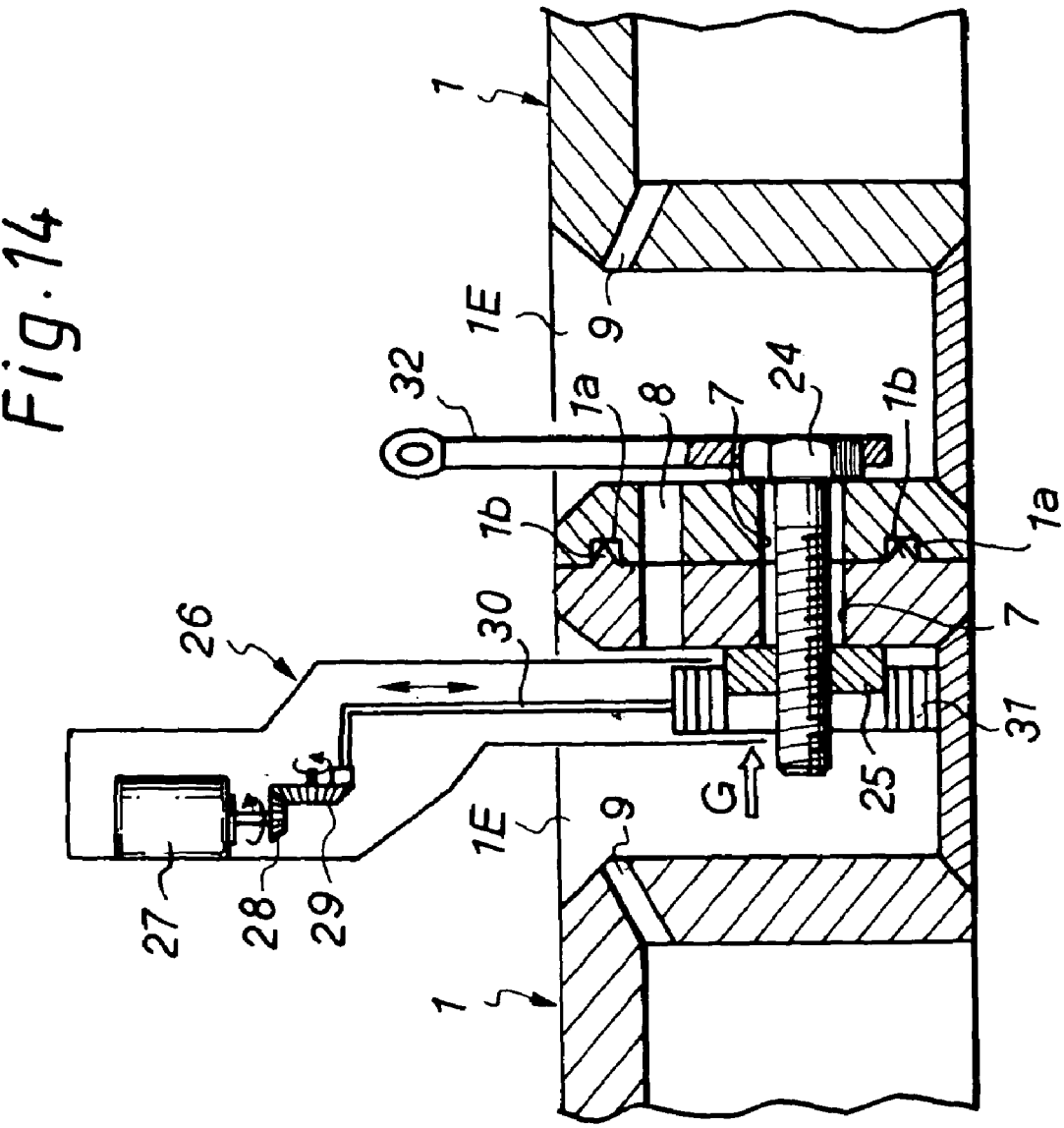
FIG. 14 is a cross-sectional view showing how to join block units adjoining in a circumferential direction.
Figure 15:
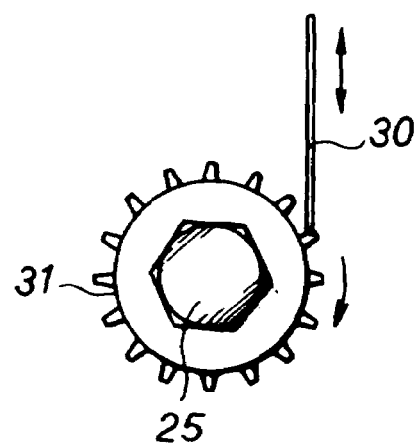
FIG. 15 is an enlarged view illustrating a portion G in FIG. 14 in greater detail.
Figure 16:
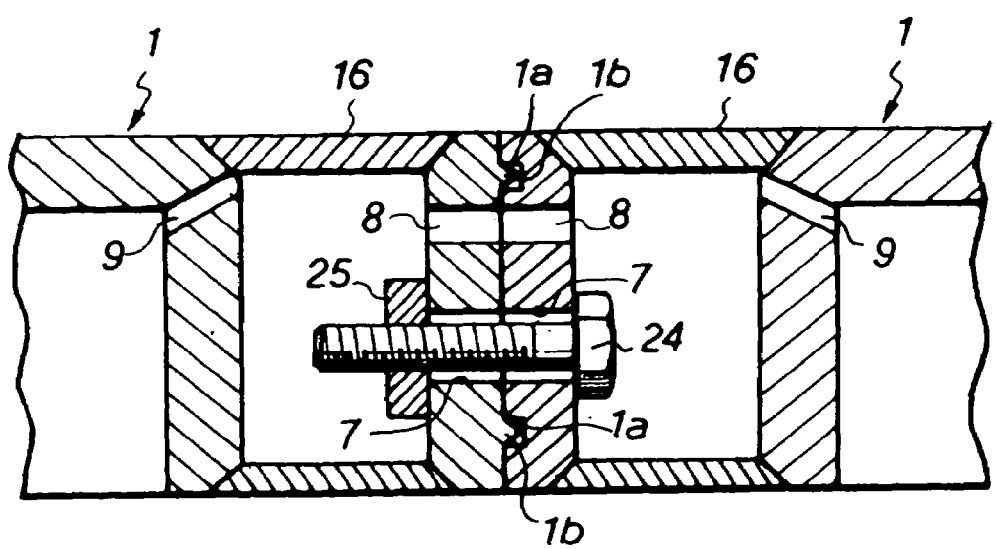
FIG. 16 is a cross-sectional view illustrating a structure for joining block units adjoining in a circumferential direction.
Figure 17:
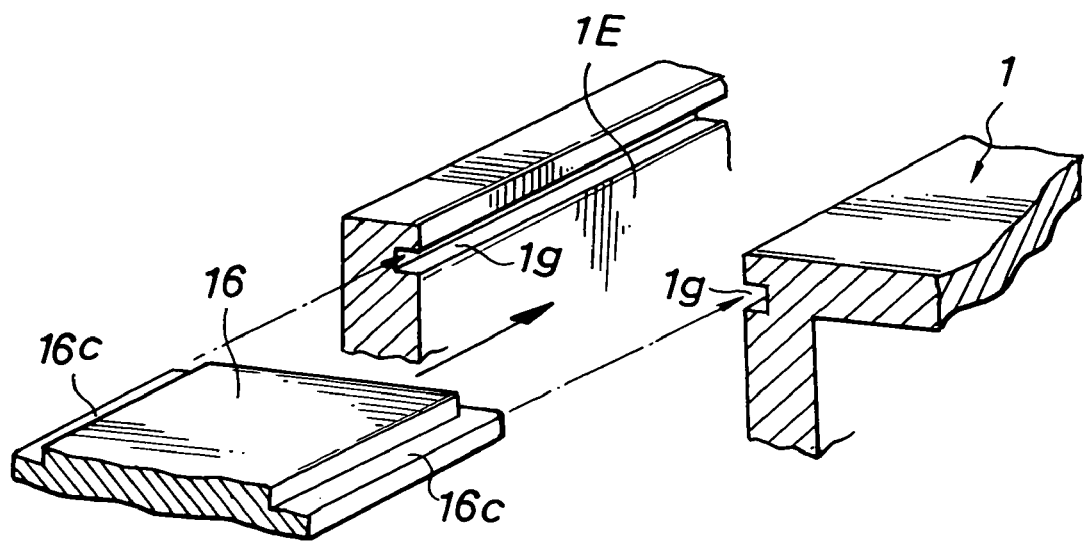
FIG. 17 is a partial perspective view illustrating another embodiment of a structure for attaching the cover.
Figure 18:
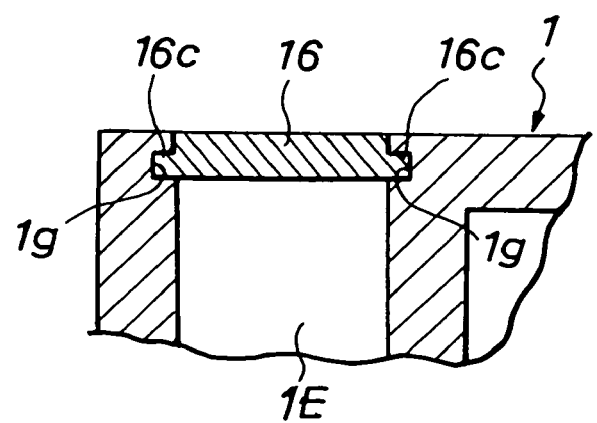
FIG. 18 is a partial cross-sectional view illustrating the a structure for attaching the cover in FIG. 17.
Figure 19:
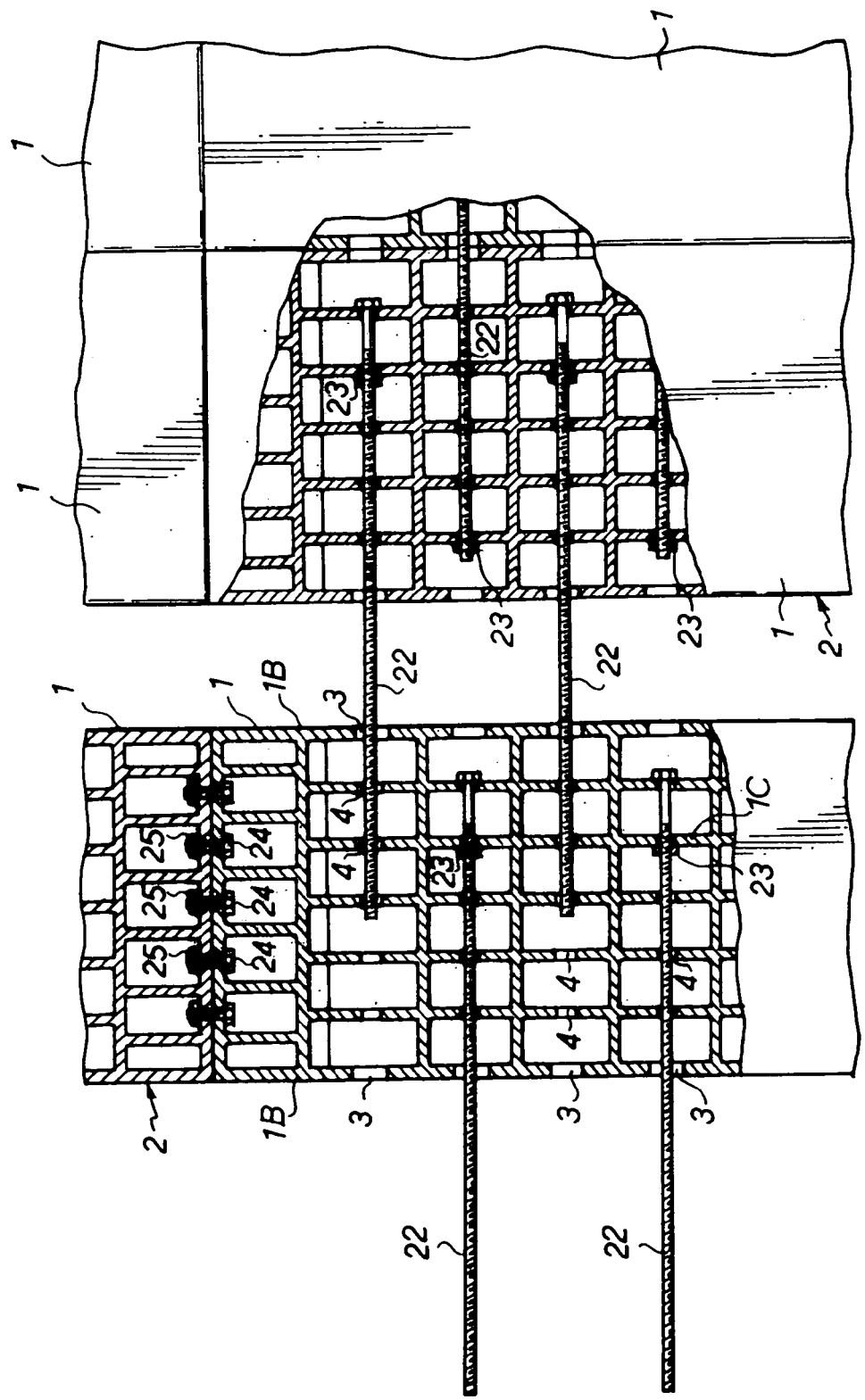
FIGS. 19 and 20 are exploded side views illustrating how to connect annular members adjoining in a longitudinal direction.
Figure 20:
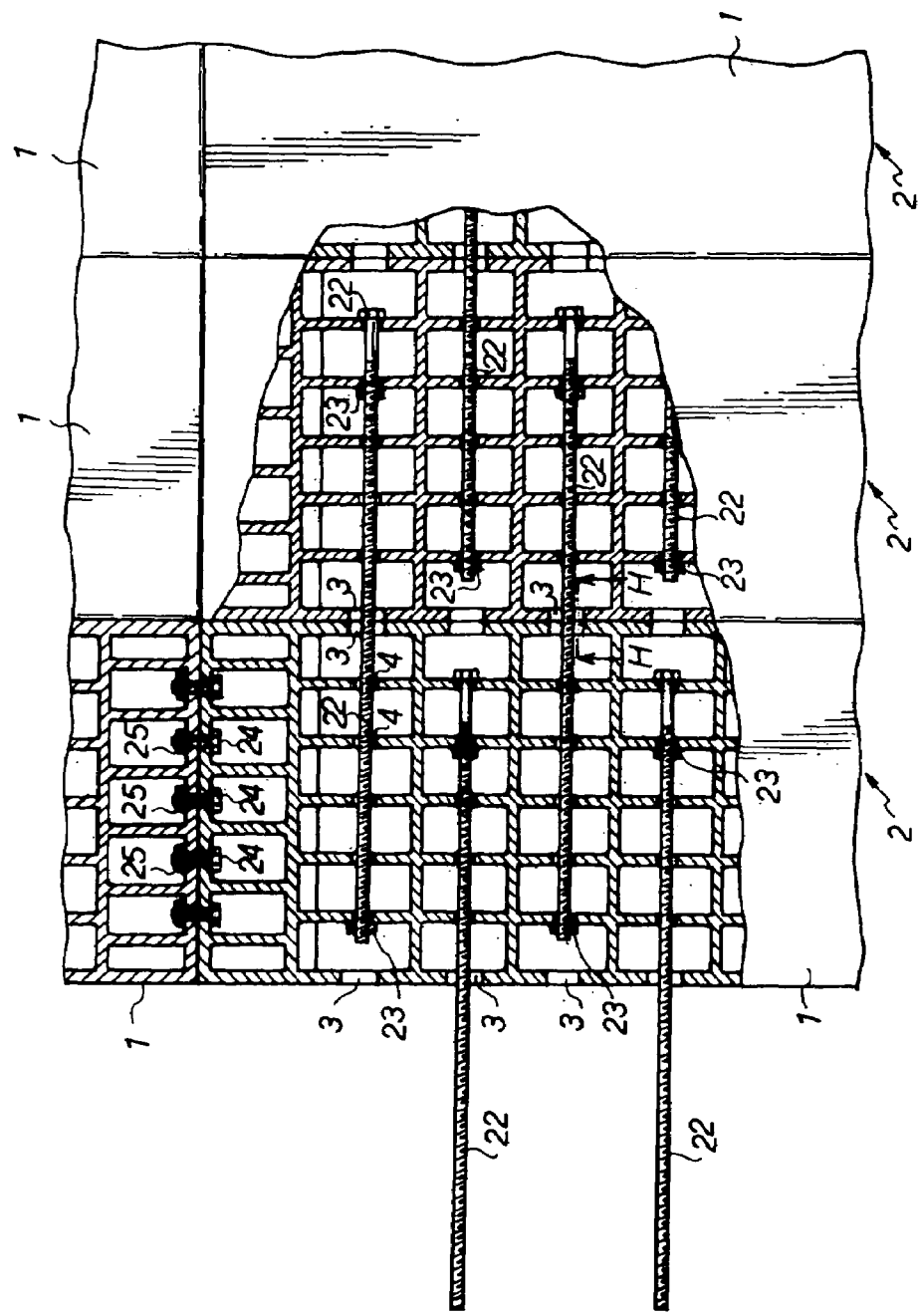
Figure 21:
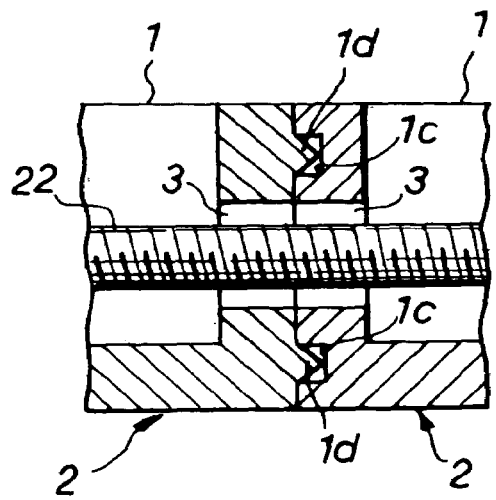
FIG. 21 is a cross-sectional view taken along a line H—H in FIG. 20.
Figure 23:
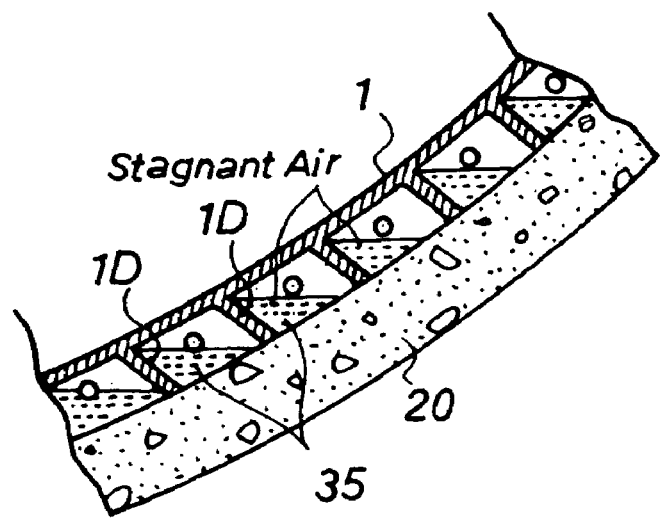
FIG. 23 is a partial transversal sectional view of a pipe showing stagnant air between a block unit and a pipe.
Figure 24:
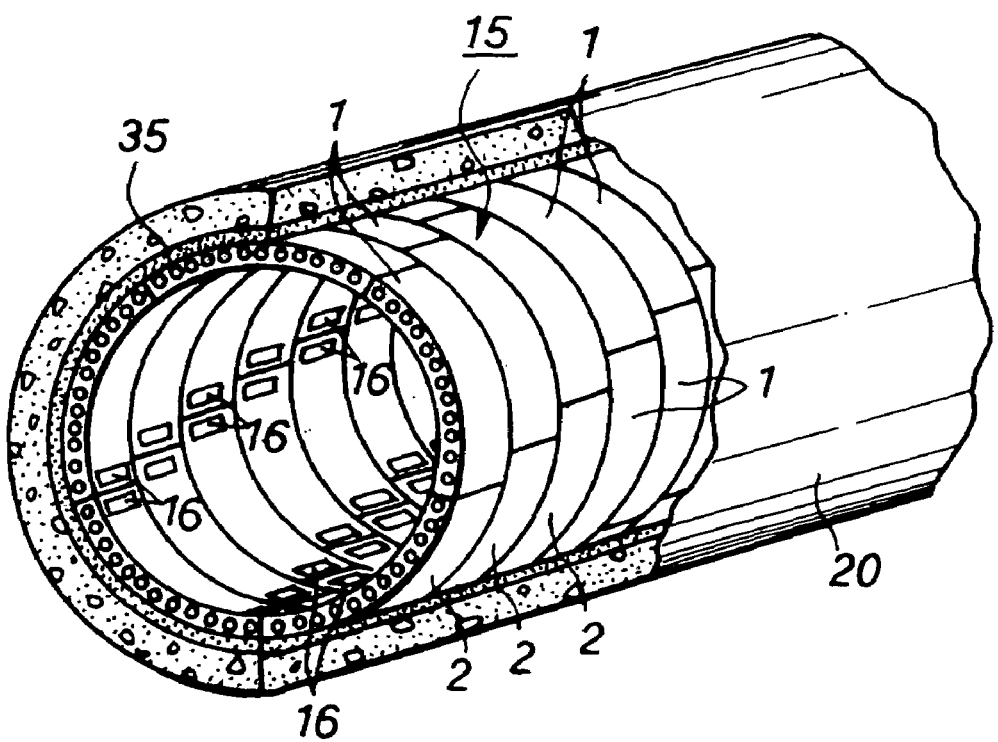
FIG. 24 is a partially exploded perspective view of a repaired pipe.

Next, a method of repairing flow passage facilities using the block unit 1 illustrated in FIGS. 1 to 9 according to one embodiment of the present invention will be described with reference to FIGS. 12 to 24 particularly in a form applied to a pipe. FIGS. 12 and 13 are cross-sectional views of a pipe for showing a method of repairing flow passage facilities according to one embodiment of the present invention; FIG. 14 is a cross-sectional view showing how to join the block units 1 adjoining in the circumferential direction; FIG. 15 is an enlarged view illustrating a portion G in FIG. 14 in greater detail; FIG. 16 is a cross-sectional view illustrating a structure for joining the block units 1 adjoining in a circumferential direction; FIG. 17 is a partial perspective view illustrating another embodiment of a structure for attaching the cover; FIG. 18 is a partial cross-sectional view illustrating the structure for attaching the cover in FIG. 17; FIGS. 19 and 20 are exploded side views illustrating how to connect annular members adjoining in a longitudinal direction; FIG. 21 is a cross-sectional view taken along a line H—H in FIG. 20; FIG. 22 is a transversal sectional view of a pipe formed with a tubular assembly therein; FIG. 23 is a partial transversal sectional view of a pipe showing stagnant air between the block unit and the pipe; and FIG. 24 is a partially exploded perspective view of a repaired pipe.

Figure 12:
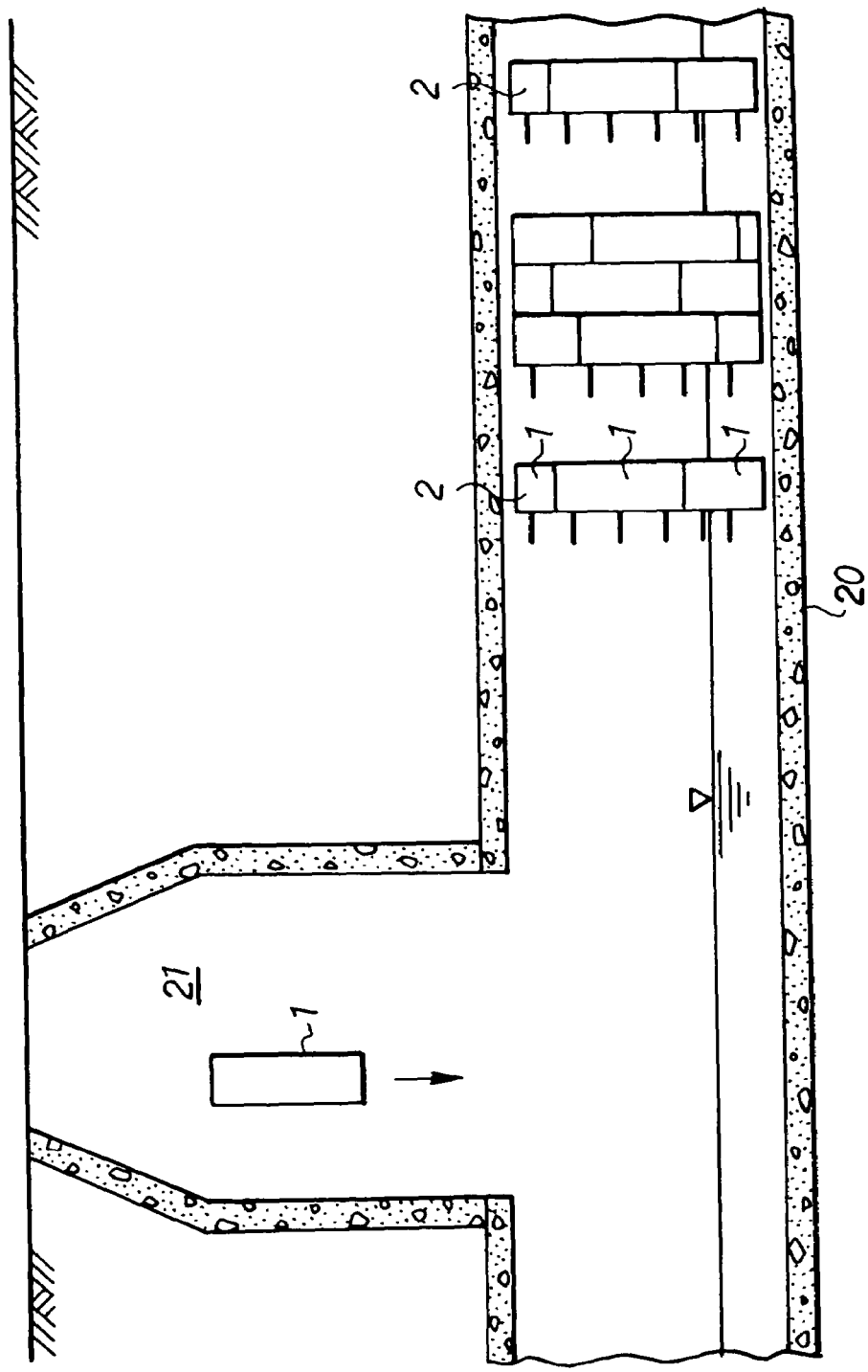
FIGS. 12 and 13 are cross-sectional views of a pipe for showing a method of repairing flow passage facilities according to one embodiment of the present invention.
Figure 13:
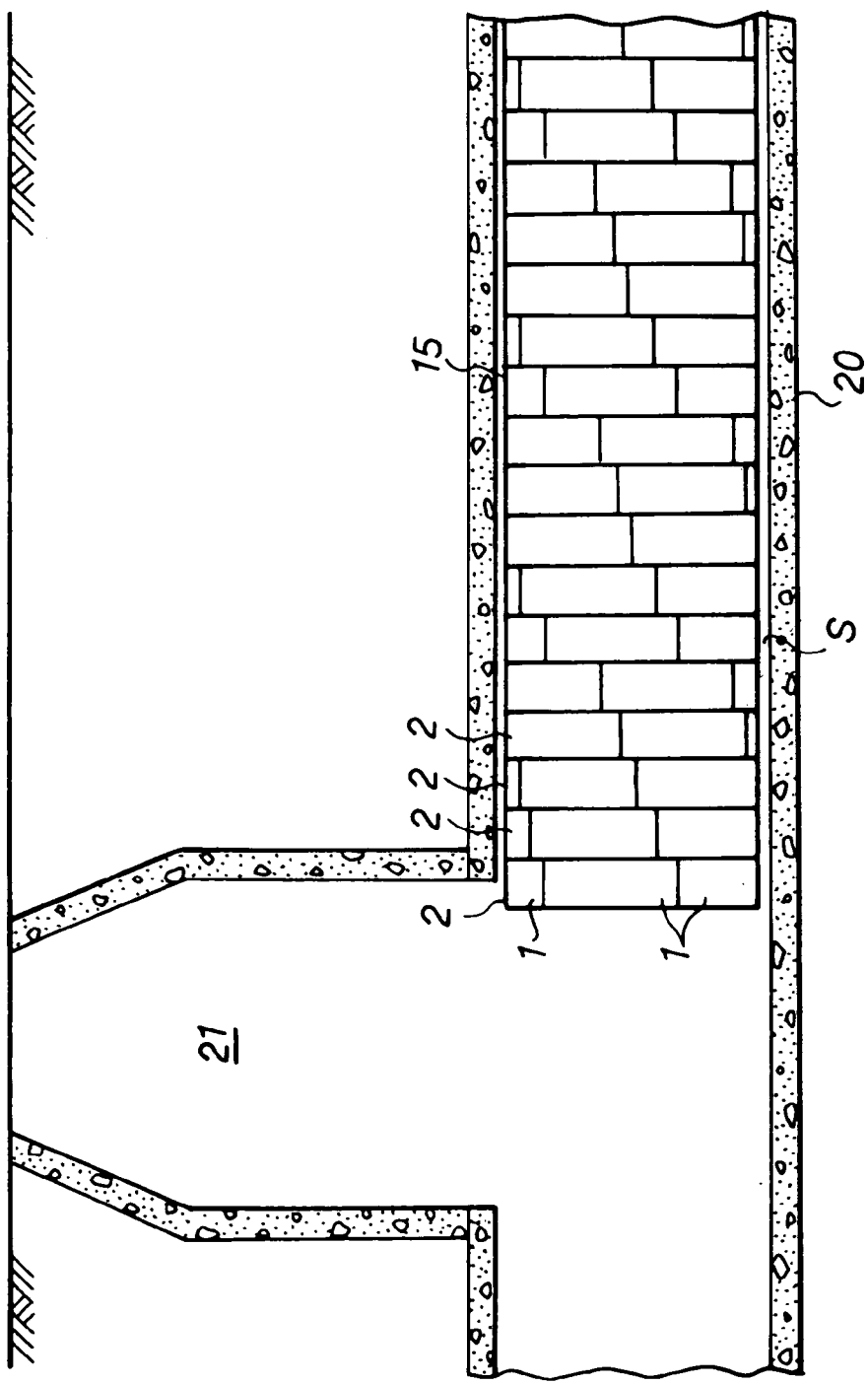

Referring first to FIGS. 12 and 13, a pipe such as a sewage pipe embedded substantially horizontally under the ground includes a manhole 21 open to the ground. The repairing method according to one embodiment of the present invention connects a plurality of annular short tubes 2, each made up of a plurality (five) of adjacent block units 1 joined in the circumferential direction, to each other in the longitudinal direction of the pipe 20 to form a single tubular assembly 15 as illustrated in FIG. 13 in the pipe 20.

The short tube 2 is formed by joining the block units 1 one by one within the pipe 20 in the circumferential direction. The tubular assembly 15 is made by connecting the respective short tubes 2 in the longitudinal direction. These operations can be performed while a service fluid such as sewage is flowing through the pipe 20. In addition, the operations can be performed even when the service fluid stays on the bottom of the pipe 20.

The block units 1 are joined in the circumferential direction in the following manner to form the short tube 2.

First, the block units 1 to be assembled are introduced into the entrance of the pipe 20 from the manhole 21, as illustrated in FIG. 12. Each block unit 1 is small in a size since a plurality of block units 1 are assembled into each short tube 2 which forms part of the tubular assembly 15. Therefore, even if the pipe 20 has a large diameter (600 mm or more), the block units 1 for use in a repair of the pipe 20 can be readily introduced thereinto from the manhole 21 and assembled into the short tubes 2.

In the block unit 1 before assembly, the outer opening of the box 1E formed at each circumferential end is covered with a cover 16 illustrated in FIGS. 10 and 11.

The cover 16 is integrally molded with a plastic material, and has engaging pawls 16a integrally formed at both lateral ends, as illustrated in FIG. 10. Also, a total of eight anchor pawls 16b are integrally formed on the lower surface of the cover 16. The cover 16 is overlaid on the box 1E of the block unit 1 to close the outer openings. The engaging pawls 16a on both ends are engaged with the rectangular holes 10 (FIG. 1) formed in the outer plate 1B of the block unit 1, and then the cover 16 is adhered or welded to cover the outer openings of the boxes 1E of the block unit 1, as described above.

Also, in the block unit 1 before assembly, seven bolts 22 (only two of which are shown in FIG. 19) longer than the length b (see FIG. 2) of the block unit 1 are alternately inserted into the bolt throughholes 3, 4 having different diameters, formed through the outer plate 1B and reinforcing ribs 1C. Each bolt 22 is secured to the block unit 1 with a nut 23 screwed therewith. A threaded portion of the bolt 22 protrudes outward from one end face of the block unit 1 as illustrated. Likewise, in each block unit 1 assembled into the short tube 2, the bolts 22 are inserted through the block unit 1 and secured on one end face, with their threaded portions protruding outward.

The head of each bolt 22 extends through a bolt throughhole 3 having a large diameter, formed through the outer plate 1B, and in contact with the reinforcing rib 1C. The nuts 23 engaged with the bolts 22 are also in contact with the reinforcing rib 1C. Therefore, the heads of the bolts 22 and nuts 23 will not be exposed to the outside of the block unit 1. The bolts 22 and nuts 23 are made of a metal such as stainless steel, iron or the like or a plastic material such as nylon, polyester or the like. A washer, a cushion material, or the like may be placed at a position at which each bolt 22 is fastened.

Two block bodies 1 adjoining in the circumferential direction are joined to each other in the following manner.

The boxes 1E of two block units 1 adjoining in the circumferential direction are in close contact with each other in the circumferential direction, as illustrated in FIG. 14. The plurality of bolt throughholes 7 and air vents 8 formed through the block units 1 are in communication with each other, and the protrusion 1b formed on the end face of one block unit 1 is fitted in the groove 1a formed in the end face of the other block unit 1 to seal the joint of the both block units 1 in the circumferential direction. In this event, an adhesive may be applied on the groove 1a and protrusion 1b to improve the adhesivity therebetween. The adhesive used herein may be an adhesive based on an epoxy resin or a tetrahydrofuran solvent, or a silicon-acrylic-, urethane, or butyl rubber-based adhesive.

Since the inner surfaces of both boxes 1E are opened, a bolt 24 is inserted from the opening of one box 1E through the bolt throughhole 7, while a nut 25 is inserted from the opening of the other box 1E and fitted on the bolt 24 (see FIG. 16). This operation is repeated to join two block units 1 adjoining in the circumferential direction to each other.

For joining the block units 1 with the bolts 24 and nuts 25, a tool 26 is used as illustrated in FIGS. 14 and 15. Specifically, the tool 26 converts the rotation of a motor 27 to reciprocal motions of a bar 30 through bevel gears 28, 29, and again converts the reciprocal motions of the bar 30 to rotating motions of a gear 31. Here, the gear 1 is fitted in the nut 25, and as illustrated in FIG. 15, the leading end of the bar 30 intermittently presses the tooth face of the gear 31 to rotate the gear 31 and nut 25 in a direction indicated by an arrow in FIG. 13 to fit the nut 25 on a thread portion of the bolt 24. In this event, a spanner 32 is used to prevent the bolt 24 from rotating.

Then, as the block units 1 adjoining in the circumferential direction are joined to each other in the manner described above as illustrated in FIG. 16, a putty is filled in the boxes 1E of both block units 1, and the respective openings on the inner surfaces are covered with the cover 16 illustrated in FIGS. 10 and 11 in the manner described above. In this event, since the cover 16 is formed with a plurality of anchor pawls 16b, the cover 16 is prevented from coming off by an anchoring effect of the anchor pawls 16 within the putty. The putty used herein for filling in the boxes 1E may be a resin putty such as an epoxy resin, a polyester resin, a silicone resin, or the like, a cement putty, or the like. The box 1E is not necessarily filled with the putty, but may be filled with a grout material after assembly.

The cover 16 for covering the opening in the inner surface of the box 1E of the block unit 1 is applied with a pressure from a grout material (see FIGS. 22 to 24), later described, so that the cover 16 fixed through adhesion could be partially peeled from the box 1E of the block unit 1 to result in a gap therebetween, from which the grout material 35 could leak out.

To prevent this problem, as illustrated in FIG. 17, a recessed groove 1g is formed along the peripheral edge of the opening in the inner surface of the box 1E of the block unit 1, while a rib-shaped protrusion 16c is formed along the peripheral edge of the cover 16, such that the protrusion 16c of the cover 16 is fitted into the recessed groove 1g of the block unit 1. Then, the cover 16 is slid relative to the block unit 1 in a direction indicated by an arrow in FIG. 17, with the result that the cover 16 is fixed to the block unit 1 through the concave-convex fitting, as illustrated in FIG. 18. In this manner, the employment of the structure for fixing the cover 16 to the block unit 1 through the concave-convex fitting ensures that the cover 16 is fixed to the block unit 1 and will not come off, even if a pressure acts on the cover 16, thereby avoiding a gap between the cover 16 and block unit 1, and a resulting leak of the grout material 35 from the gap.

As the short tube 2 is formed as described above, a plurality of short tubes 2 are connected to each other in the longitudinal direction of the pipe 20 as illustrated in FIG. 12 to form a single tubular assembly 15, as illustrated in FIG. 13, within the pipe 20. In the following, description will be made on how to connect the short tubes 2 in the longitudinal direction.

Referring to FIG. 19, the bolts 22 protruding from an assembled short tube 2 (short tube 2 adjoining in the longitudinal direction of the pipe 20) are inserted into remaining bolt throughholes 3, 4, through which no bolts are inserted, of a short tube 2 before assembly, and the short tube 2 before assembly is brought into close contact with the assembled short tube 2, as illustrated in FIGS. 20 and 21. Consequently, as illustrated in FIGS. 21, the protrusion 1d on the end face of the short tube 2 before assembly is fitted into the recess 1c formed in the end face of the assembled short tube 2 to align both short tubes 2 as well as seal the joint of both short tubes 22.

Subsequently, a nut 23 fitted on the end of the bolt 22 is fastened with a tool which is introduced from the bolt throughhole 3 having a larger diameter to assemble the short tube 2 before assembly into the assembled short tube 2, as illustrated in FIG. 20. In this event, since the head of the bolt 22 and the nut 23 are not exposed to the outside of the block 1 as described above, the two short tube 2 adjoining in the longitudinal direction of the pipe 20 are connected in close contact.

When the two short tubes adjoining in the longitudinal direction of the pipe 20 are connected to each other as described above, the short tubes 2 are sequentially assembled in the longitudinal direction of the pipe 20 in a similar manner to form a single tubular assembly 15 within the pipe 20.

Since the tubular assembly 15 formed within the pipe 20 has an outer diameter smaller than the inner diameter of the pipe 20, a clearance S (see FIGS. 13 and 22) is formed between the tubular assembly 15 and pipe 20. The tubular assembly 15 floats up by buoyancy to reduce an upper radial gap of the clearance S above the tubular assembly 15.

To solve this inconvenience, in this embodiment, a triangular support 40 is disposed within the tubular assembly 15 to extend the tubular assembly 15 to ensure the tubular shape of the tubular assembly 15. In addition, the spacing between the inner wall of the pipe 20 and the tubular assembly 15 is adjusted by the spacer 36 (see FIG. 3) provided in the block unit 1 which bases the tubular assembly 15 to form a substantially uniform gap of the clearance space S between the pipe 20 and tubular assembly 15. Specifically, since the gap of the clearance space S is determined by the bolt 38, the leading end of which comes in contact with the inner wall of the pipe 20, the bolt 38 is rotated to change the length of a portion of the bolt 38 which protrudes outward from the tubular assembly 15, thereby arbitrarily adjusting the gap of the clearance space S.

The support 40 arranged within the tubular assembly 15 is adjusted an urging force applied to the tubular assembly 15 by rotating an adjuster bolt 41. The urging force is transmitted to the tubular assembly 15 through an arcuate supporting plate 42 so that the tubular assembly 15 is radially opened outward and therefore ensures the tubular shape. Otherwise, for preventing the tubular assembly 15 from floating up due to buoyancy, water may be stored within the tubular assembly 15.

Then, ends of the clearance space S are closed by a sealing material, not shown, made of a resin putty or mortar. A grout hose 34 is connected to a hole 1e formed in a portion of the block unit 1 which bases the tubular assembly 15, as illustrated in FIG. 22, to inject a grout material 35 such as cement mortar, resin mortar, or the like from the grout hose 34 into the clearance space S. The cement mortar may be mixed with emulsion for improving the adhesivity, or mixed with an anti-freezing agent for preventing the cement mortar from being frozen. The resin mortar is mainly made up of an epoxy resin and a polyester resin.

When the convex plate 1D of each block unit 1 is not formed with the space 5 shown in FIG. 6 or the space 5' shown in FIG. 7, the grout material 35 injected into the clearance space S as described above would cause air to stay, as illustrated in FIG. 23, resulting in a failure in filling the clearance space S with the grout material 35.

To solve this problem, in this embodiment, the convex plate 1D of each block unit 1 is formed with the space 5 shown in FIG. 6 or with the space 5' shown in FIG. 7. The space 5 or 5' thus formed allows air to pass therethrough to the outside, thereby preventing the air from staying in the clearance space S and therefore ensuring that the clearance space S is filled with the grout material 3. In addition, since a plurality of bolt throughholes 7 and air vents 8 are formed through the outer plate 1B which defines the circumferential surface of the box 1E of each block unit 1, air will be emitted through the space 5 or 5' formed in the convex plate 1D, wherever the block units 1 are joined, to prevent air from staying in the clearance space S.

Upon curing of the grout material 35 injected into the clearance space S formed between the tubular assembly 15 and pipe 20, the tubular assembly 15 is integrated with the pipe 20, so that the inner wall of the pipe 20 is lined with the tubular assembly 15 and therefore repaired.

In the foregoing embodiment, for connecting the short tubes 2 adjoining in the longitudinal direction to each other, joints of the block units 1 are shifted in the circumferential direction to prevent the joints from overlapping in the longitudinal direction.

As described above, according to the present invention, a plurality of block units 1 are joined to each other in the circumferential direction to form the short tubes 2 within the pipe 20, and the short tubes 2 are connected to each other in the longitudinal direction to form the continuous tubular assembly 15 having an outer diameter smaller than the inner diameter of the pipe 20 within the pipe 20, so that the pipe, even having a large diameter, can be repaired by introducing the block units 1 into the pipe through the manhole 21, and assembling the block units 1 into the continuous tubular assembly 15 within the pipe 20. Moreover, since this operation can be performed while a service fluid is flowing through the pipe 20, a desired repair can be made for the pipe 20 even having a large diameter while the service fluid is flowing therethrough.

Also, in the foregoing embodiment, the bolt throughholes 4 formed through the reinforcing ribs 1C of the block unit 1, the bolts 22 inserted therethrough, and the reinforcing steel rods 17 as reinforcement materials function to anchor the grout material 35, so that the block units 1, i.e., the tubular assembly 15 is integrated with the pipe 20 through the grout material 35, thereby ensuring a high strength for the repaired pipe 20.

Figure 25:
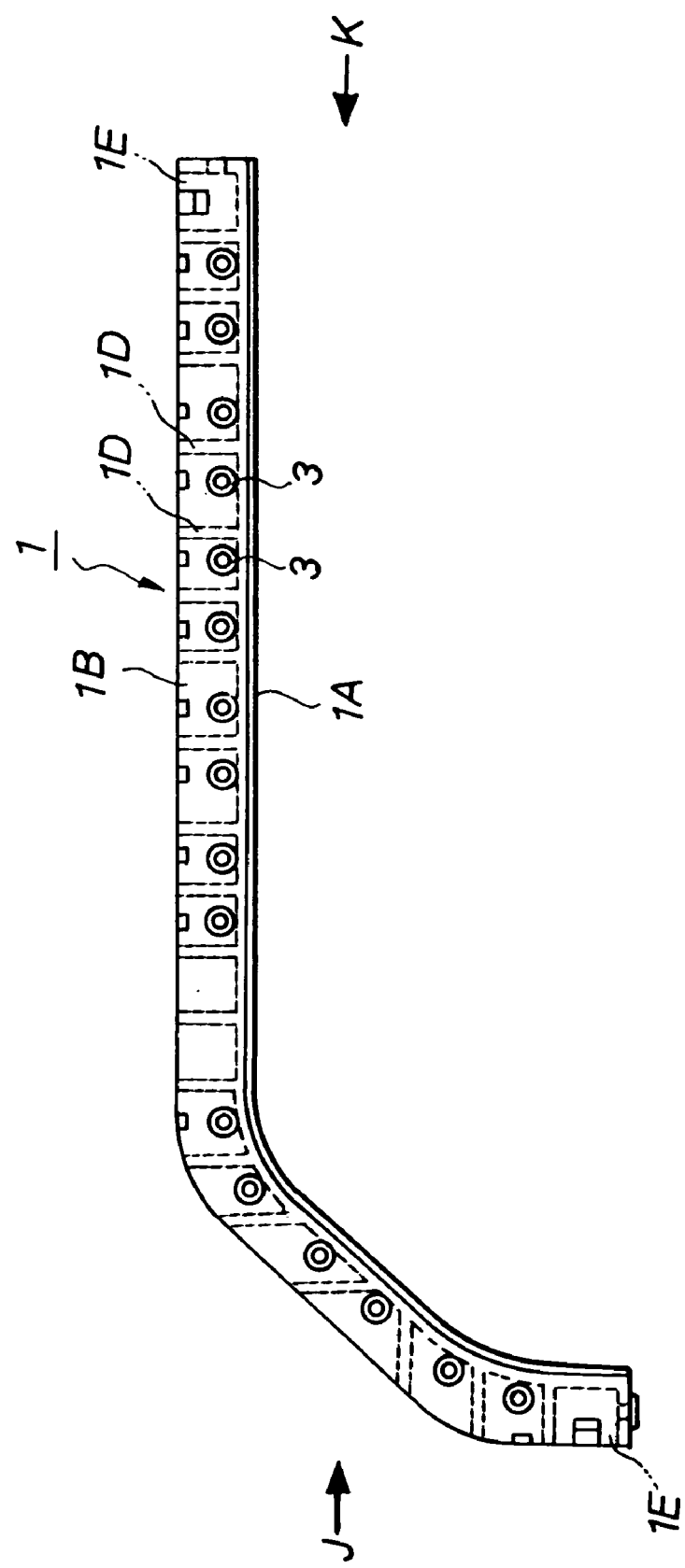
FIG. 25 is a side view of a block unit for repairing flow passage facilities according to another embodiment of the present invention.
Figure 26:
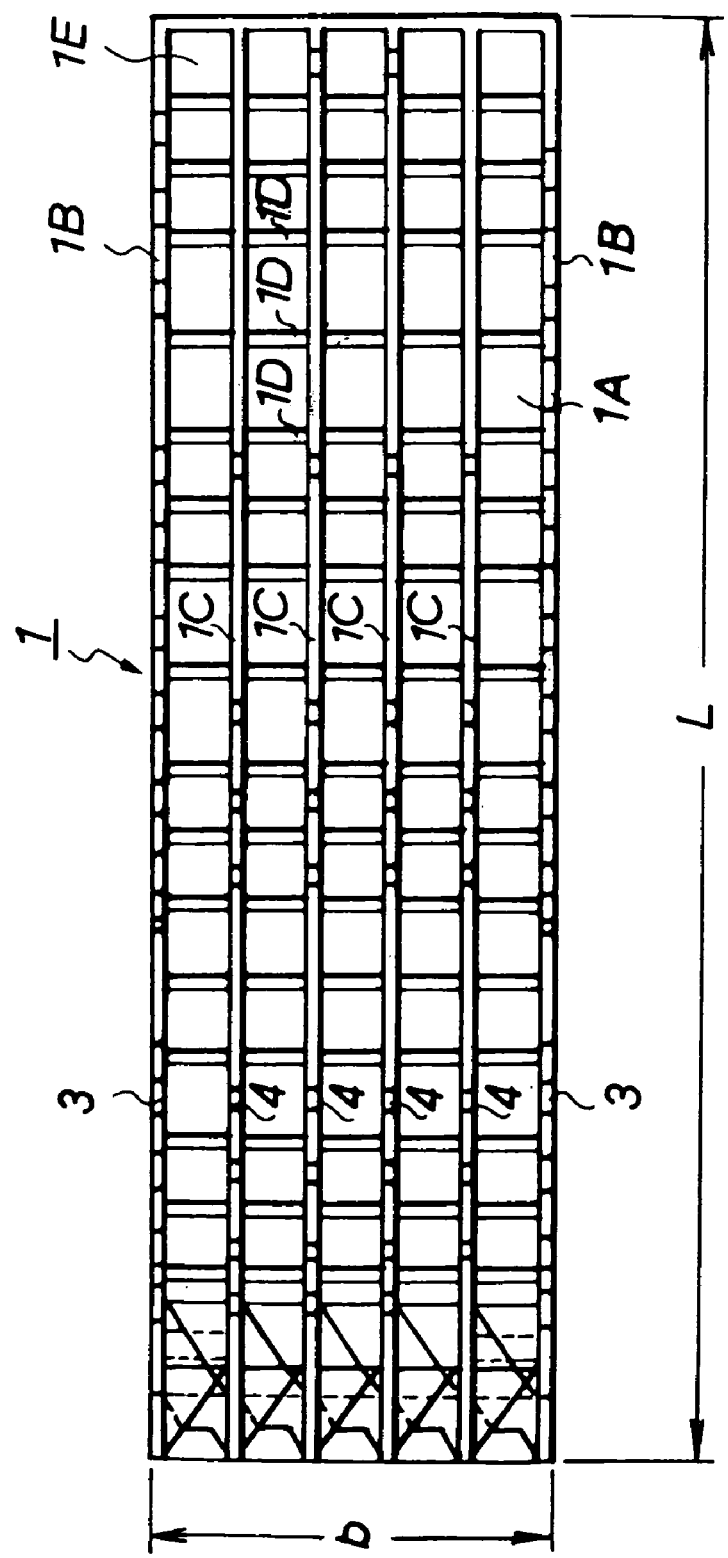
FIG. 26 is a plan view of the block unit for repairing flow passage facilities according to the embodiment illustrated in FIG. 25.
Figure 27:
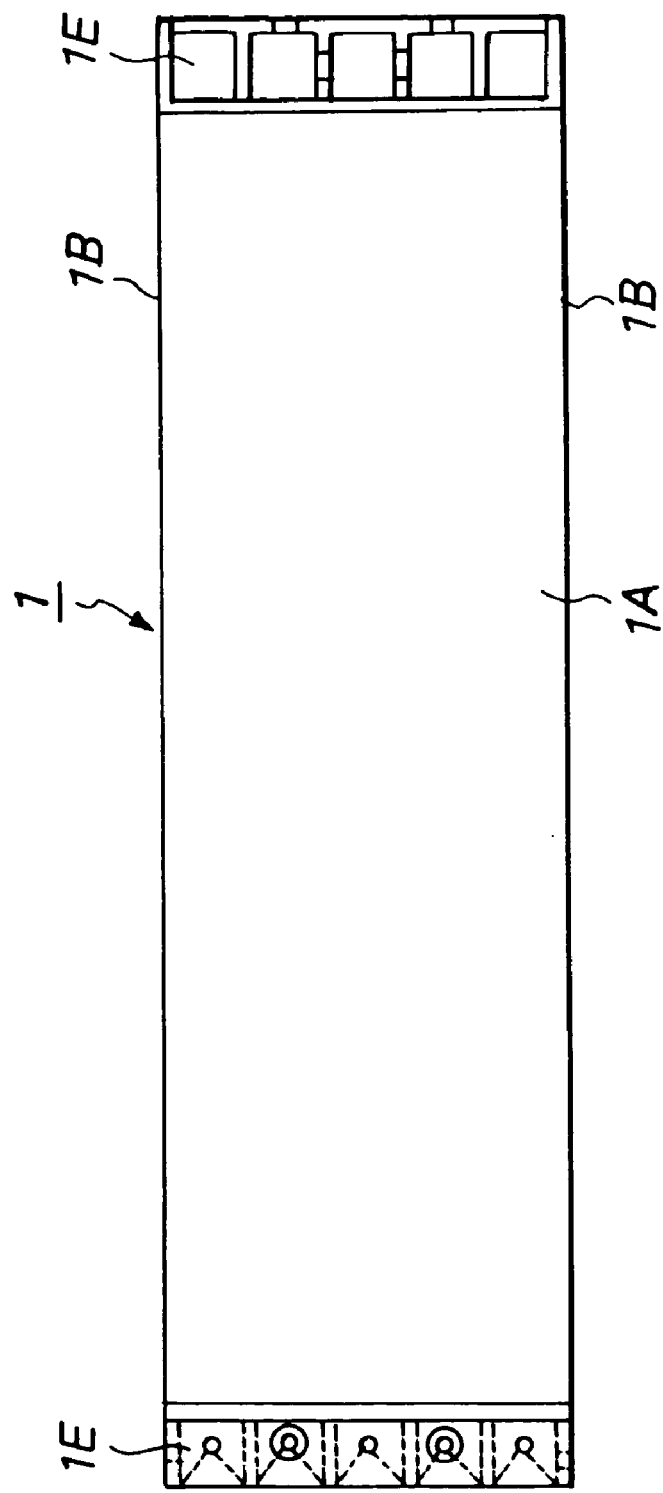
FIG. 27 is a bottom view the block unit for repairing flow passage facilities according to the embodiment illustrated in FIG. 25.
Figure 28:
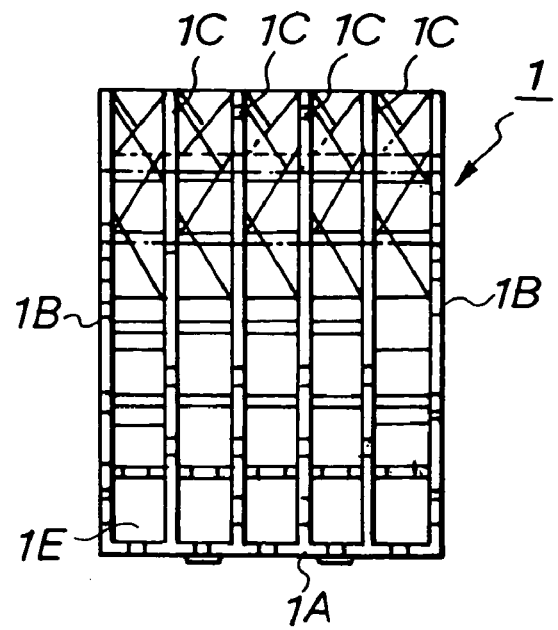
FIG. 28 is a diagram illustrating the block unit when seen in a direction indicated by an arrow J in FIG. 25.
Figure 29:
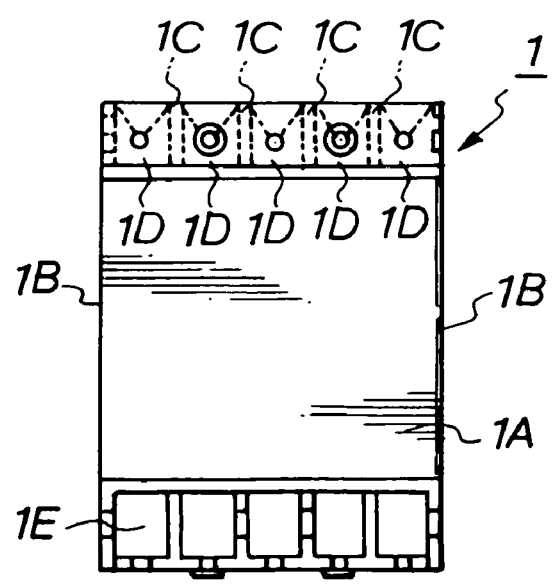
FIG. 29 is a diagram illustrating the block unit when seen in a direction indicated by an arrow K in FIG. 25.

While the foregoing embodiment has been described for a tubular pipe to which the present invention is applied, it should be understood that the present invention can be similarly applied to repair rectangular or horseshoe-shaped flow passage facilities. For repairing a box culvert pipe having a rectangular cross section, by way of example, a block unit 1 as illustrated in FIGS. 25 to 29 may be used. FIG. 25 is a side view of the block unit 1; FIG. 26 is a plan view of the block unit 1; FIG. 27 is a bottom view of the block unit 1; and FIGS. 28 and 29 are views in a directions indicated by arrows J and K, respectively. In these figures, components identical to those illustrated in FIGS. 1 to 4 are designated the same reference numerals.

Figure 30:
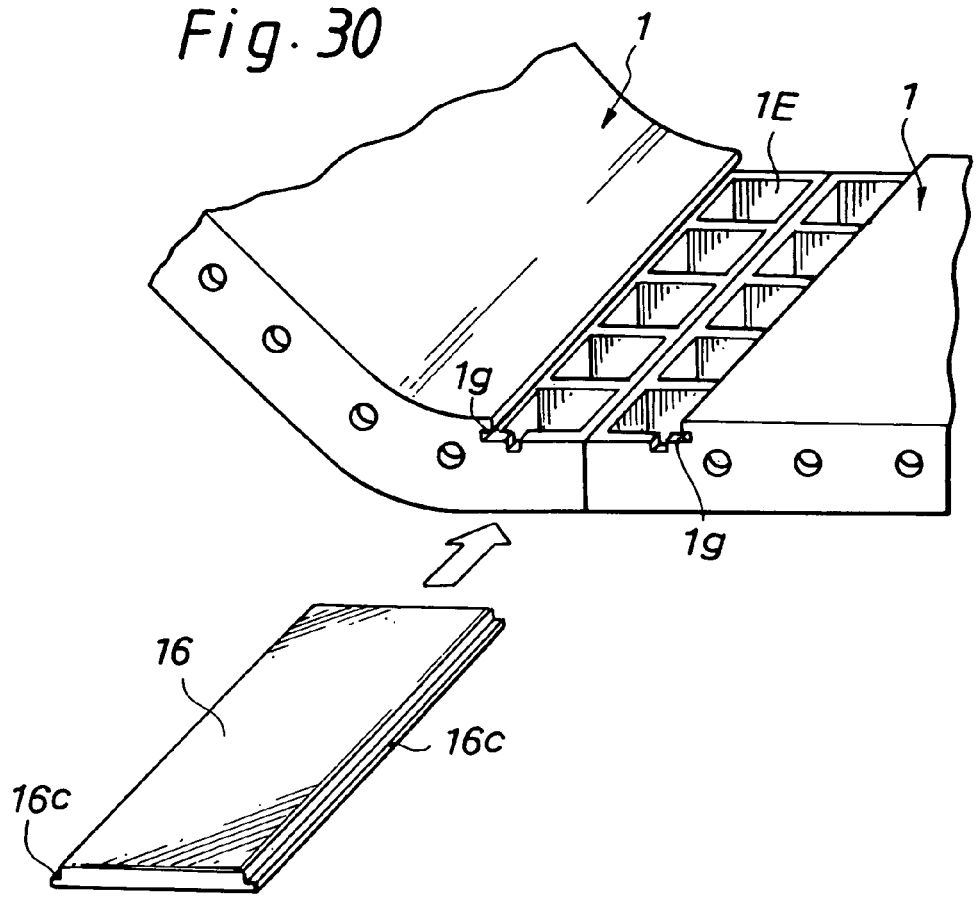
FIG. 30 is a partial perspective view illustrating another embodiment of a structure for attaching the cover.
Figure 31:
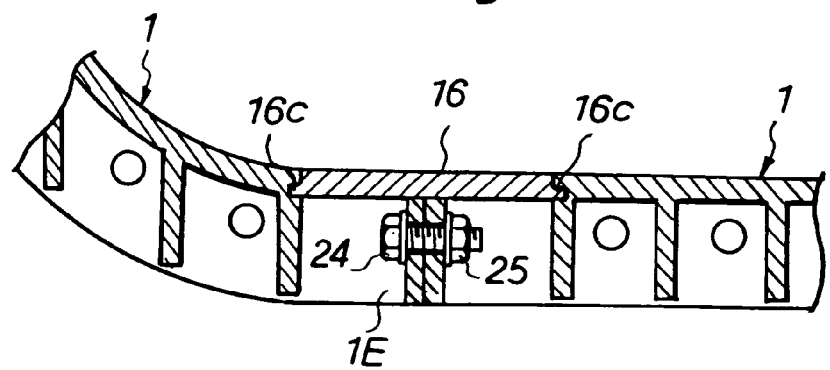
FIG. 31 is a partial cross-sectional view illustrating the structure for attaching the cover of FIG. 30.

Likewise, as illustrated in FIGS. 30 and 31, a recessed groove 1g is formed along the peripheral edge of the opening in the inner surface of the box 1E of the block unit 1, while a rib-shaped protrusion 16c is formed along the peripheral edge of the cover 16, such that the protrusion 16c of the cover 16 is fitted into the recessed groove 1g of the block unit 1. Then, the cover 16 is slid relative to the block unit 1 in a direction indicated by an arrow in FIG. 30, with the result that the cover 16 is fixed to the block unit 1 through the concave-convex fitting, as illustrated in FIG. 31. In this manner, the employment of the structure for fixing the cover 16 to the block unit 1 through the concave-convex fitting ensures that the cover 16 is fixed to the block unit 1 and will not come off, even if a pressure acts on the cover 16, thereby avoiding a gap between the cover 16 and block unit 1, and a leak of the grout material 35 from the gap.

As will be apparent from the foregoing description, according to the present invention, a plurality of the block units for repairing flow passage facilities are assembled into a tubular assembly. The block unit is made up of an inner plate defining an inner surface, an outer plate disposed along a peripheral edge of the inner plate, a plurality of reinforcing ribs for reinforcing the inner plate and the outer plate, and a plastic material for integrally forming the inner plate, the outer plate, and the reinforcing ribs into the block unit. The method of repairing flow passage facilities using the block units includes joining the block units adjoining in a circumferential direction with bolts inserted through both circumferential end faces of each the block unit and nuts fitted on the bolts associated therewith to form a short tube within a flow passage, connecting the short tubes in a longitudinal direction to form a continuous tubular assembly having an outer diameter smaller than an inner diameter of the flow passage, and injecting a grout material into a clearance space formed between the tubular assembly and the flow passage. Advantageously, the present invention permits a desired repair operation even for a pipe having a large diameter while a service fluid is flowing therethrough.

While the present invention has been described in connection with its preferred embodiments, it is to be understood that various modifications will occur to those skilled in the art without departing from the spirit of the invention. For example, while the tubular assembly formed by the block units is illustrated as having circular inner and outer shapes (i.e., circular in cross section), it is understood that inner passage of the tubular assembly can have other shapes (e.g., oval, square or hexagonal), and the outer surface of the tubular assembly can have other shapes (e.g., oval, square or hexagonal) and that the inner and outer shapes need not correspond to each other. The scope of the present invention is therefore to be determined solely by the appended claims.

What is claimed is:

1. A block unit for repairing a flow passage facility comprising an inner plate defining an inner surface of said block unit, said inner surface being exposed to sewage, an outer plate disposed along a peripheral edge of said inner plate, and a plurality of reinforcing ribs for reinforcing said inner plate and said outer plate, said inner plate, said outer plate, and said plurality of reinforcing ribs being unitarily formed as said block unit, said unitarily formed block unit being configured to assemble with additional unitarily formed block units to form a tubular assembly that remains part of said flow passage facility.

2. The block unit according to claim 1, wherein said inner plate, said outer plate and said reinforcing ribs are formed with a plastic material.

3. The block unit according to claim 2, wherein said plastic material is transparent or translucent.

4. The block unit according to claim 1, wherein said outer plate and said reinforcing ribs define bolt throughholes.

5. A block unit for repairing a flow passage facility comprising an inner plate defining an inner surface, an outer plate disposed along a peripheral edge of said inner plate, and a plurality of reinforcing ribs for reinforcing said inner plate and said outer plate, said block unit being configured to assemble with other block units so as to form a tubular assembly, said block unit having a circumferential dimension larger than a width dimension, said block unit defining an opening to allow grout material to be injected from an inner-surface side of the block unit, through said outer plate, into a clearance space, which is formed between said tubular assembly and said flow passage facility, to fix said tubular assembly to said flow passage facility as part of said flow passage facility.

6. A tubular assembly for repairing a flow passage facility comprising a plurality of short tubes assembled in a longitudinal direction with each other to remain as part of said flow passage facility, each one of the short tubes comprising a plurality of unitarily funned block units connected in a circumferential direction with one another at circumferential ends of said block units, at least one of the block units comprising an inner plate defining an inner surface of said block unit, said inner surface being exposed to sewage, an outer plate disposed along a peripheral edge of said inner plate, and a plurality of reinforcing ribs for reinforcing said inner plate and said outer plate, wherein said inner plate, said outer plate, and said reinforcing ribs are unitarily formed as said block unit, said block unit being configured to connect to additional block units in a circumferential direction to form said short tube.

7. The tubular assembly according to claim 6 comprising a pair of the outer plates opposed to each other, and a length of the inner plate in the circumferential direction being larger than a length between the outer plates.

8. A method of repairing a flow passage facility using a plurality of block units, said block units being assembled into a tubular assembly, said block unit incorporating at least an inner plate defining an inner surface, and an outer plate disposed along a peripheral edge of said inner plate, said method comprising joining the block units adjoining in a circumferential direction to form a short tube within said flow passage facility such that said inner surface of said inner plate is exposed to sewage after said flow passage facility is repaired, forming a plurality of short tubes by repeating the step of joining block units, connecting said short tubes in a longitudinal direction to form a continuous tubular assembly having an outer diameter smaller than an inner diameter of the flow passage, and injecting a grout material into a clearance space fanned between said tubular assembly and said flow passage facility to fix said tubular assembly onto said flow passage facility as part of said flow passage facility.

9. The method according to claim 8, wherein the joining of the block units is made with bolts inserted through both circumferential end faces of each said block unit and nuts fitted on said bolts associated therewith.

10. A block unit for repairing a flow passage facility comprising an inner plate and an outer plate disposed along a peripheral edge of said inner plate, said block unit being configured to assemble with additional block units to form a tubular assembly that remains as part of said flow passage facility, wherein the inner plate of said block unit constitutes an inner wall of the tubular assembly and is exposed to sewage, and the outer plate of said block unit extends from the inner wall of the tubular assembly toward the inner surface of a pipe to be repaired in the flow passage facility.

11. A block unit for repairing a flow passage facility according to claim 10, wherein said block unit is provided with reinforcing ribs for reinforcing said inner plate and said outer plate.

12. A block unit for repairing a flow passage facility according to claim 10, wherein said inner plate and said outer plate are formed with a plastic material.

13. A block unit for repairing a flow passage facility according to claim 12, wherein said plastic material is transparent or translucent.

14. A block unit for repairing a flow passage facility according to claim 10, wherein said outer plate defines bolt throughholes.

15. A block unit for repairing a flow passage facility according to claim 10, wherein said block unit has a circumferential dimension larger than a width dimension.

16. A tubular assembly for repairing a flow passage facility comprising a plurality of short tubes assembled with each other to remain as part of said flow passage facility, each one of the short tubes comprising a plurality of block units, at least one of the block units comprising an inner plate and an outer plate disposed along a peripheral edge of said inner plate, wherein the inner plate of said block unit constitutes an inner wall of the tubular assembly and is exposed to sewage, and the outer plate of said block unit extends from the inner wall of the tubular assembly toward the inner surface of a pipe to be repaired in the flow passage facility.

17. A tubular assembly according to claim 16, wherein said block unit is provided with reinforcing ribs for reinforcing said inner plate and said outer plate.

18. A method of repairing a flow passage facility having a sewer pipe to be repaired, said method comprising:

providing a block unit comprising an inner plate and an outer plate;

assembling said block unit with additional block units to form a tubular assembly that remains as part of said flow passage facility, wherein the inner plates of said block units form an inner wall of the tubular assembly;

said assembling comprising (i) exposing the inner wall of the tubular assembly to a sewage flow path, and (ii) orienting the outer plate of said block unit so that it extends from the inner wall of the tubular assembly toward an inner surface of said sewer pipe in the flow passage facility.

19. A method of repairing a flow passage facility according to claim 18, wherein said providing comprises including reinforcing ribs in said block unit for reinforcing said inner plate and said outer plate.

20. A method of repairing a flow passage facility according to claim 18, wherein said providing comprises providing said inner plate and said outer plate in the form of plastic material.

21. A method of repairing a flow passage facility according to claim 20, wherein said providing comprises providing said plastic material in the form of transparent or translucent material.

22. A method of repairing a flow passage facility according to claim 18, wherein said providing comprises including bolt throughholes in said outer plate.

23. A block unit for repairing a flow passage facility according to claim 18, wherein said assembling comprises assembling block units having a circumferential dimension larger than a width dimension.

24. A method of repairing a flow passage facility having a sewer pipe to be repaired, said method comprising:

providing a plurality of short tubes to remain as part of said flow passage facility, each one of the short tubes comprising a plurality of block units, at least one of the block units comprising an inner plate and an outer plate disposed along a peripheral edge of said inner plate;

assembling the short tubes into a tubular assembly such that (i) the inner plates of said block units form an inner wall of the tubular assembly and said inner wall is exposed to a sewage flow path, and (ii) the outer plates of said block units extend from the inner wall of the tubular assembly toward an inner surface of said sewer pipe in the flow passage facility.

25. A tubular assembly according to claim 24, wherein said providing comprises including reinforcing ribs in each of said plurality of block units for reinforcing said inner plate and said outer plate.

* * * * *

UNITED STATES PATENT AND TRADEMARK OFFICE
CERTIFICATE OF CORRECTION

| | | |
|---|---|---|
| PATENT NO. | : 7,056,064 B2 | |
| APPLICATION NO. | : 10/255935 | |
| DATED | : June 6, 2006 | |
| INVENTOR(S) | : Kamiyama et al. | |

It is certified that error appears in the above-identified patent and that said Letters Patent is hereby corrected as shown below:

Page 2, under the U.S. Patent Documents list, the 6th patent listed – delete "4,954,106" and insert -- 4,954,016--, therefore.

Page 2, under the U.S. Patent Documents list, the 6th patent listed – delete "Shuh-Chin" and insert -- Storgard--, therefore.

Page 2, under the U.S. Patent Documents list, the 6th patent listed – delete "440/21" and insert --405/184--, therefore Col. 9, Line 47, Column 6 – after "small in" delete "a"

Col. 3, Line 59, Column 11 – in claim 6, delete "funned" and insert --formed--, therefore.

Col. 4, Line 22, Column 12 – in claim 8, delete "fanned" and insert --formed--, therefore.

Signed and Sealed this

Second Day of January, 2007

JON W. DUDAS
*Director of the United States Patent and Trademark Office*